US009345959B2

(12) United States Patent
Nonaka et al.

(10) Patent No.: US 9,345,959 B2
(45) Date of Patent: *May 24, 2016

(54) NON-TRANSITORY COMPUTER-READABLE RECORD MEDIUM, GAME SYSTEM AND INFORMATION PROCESSING DEVICE

(71) Applicant: DeNA Co., Ltd., Tokyo (JP)

(72) Inventors: Shinichiro Nonaka, Tokyo (JP); Kazuhiro Yoshimi, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/228,732

(22) Filed: Mar. 28, 2014

(65) Prior Publication Data

US 2014/0213351 A1    Jul. 31, 2014

Related U.S. Application Data

(63) Continuation of application No. 13/851,569, filed on Mar. 27, 2013, now Pat. No. 8,684,835.

(30) Foreign Application Priority Data

Mar. 29, 2012   (JP) .................................. 2012-077353

(51) Int. Cl.
  *A63F 9/00*   (2006.01)
  *A63F 13/00*  (2014.01)
  *A63F 13/30*  (2014.01)

(52) U.S. Cl.
  CPC ................. *A63F 13/00* (2013.01); *A63F 13/12* (2013.01); *A63F 2300/552* (2013.01); *A63F 2300/5586* (2013.01)

(58) Field of Classification Search
  None
  See application file for complete search history.

(56) References Cited

U.S. PATENT DOCUMENTS 6,132,315 A    10/2000  Miyamoto et al. .............. 463/43
6,220,964 B1   4/2001   Miyamoto et al. .............. 463/43

(Continued)

FOREIGN PATENT DOCUMENTS

JP    2008253521 A    10/2008
JP    2008-264183 A   11/2008

OTHER PUBLICATIONS

"Hobby Japan MOOK 267" MJ4 Koryaku-Taizen, Hobby Japan Co., Ltd., Dec. 12, 2008, Second edition, 6 pages.

(Continued)

*Primary Examiner* — Seng H Lim
(74) *Attorney, Agent, or Firm* — Rothwell, Figg, Ernst & Manbeck, P.C.

(57) ABSTRACT

An object of the present invention is to relieve time and effort required for manipulated input. The game program according to the present invention causes a computer to perform, an offering process to offer the game content to the user; a recording process to record an offered game content offered in the offering process, as an owned game content owned by the user; a reception process to receive a prearranged registration of a specified game content specified by an input from a user; a judgment process, when an offer game content is offered to a user in the offering process after the reception process, to compare the offered game content to the specified game content prearranged for registration, to judge whether or not the offered game content is to be made an owned game content of the user; and an update process to update a record of the owned game content owned by the user based on a judgment result in the judgment process.

4 Claims, 14 Drawing Sheets

(56) References Cited

U.S. PATENT DOCUMENTS

| | | | |
|---|---|---|---|
| 6,251,010 B1 | 6/2001 | Tajiri et al. | 463/1 |
| 6,334,815 B2 | 1/2002 | Miyamoto et al. | 463/43 |
| 6,993,500 B2 | 1/2006 | Ishihara | 705/27.1 |
| 7,179,171 B2 | 2/2007 | Forlines et al. | 463/41 |
| 7,371,165 B2 | 5/2008 | Reizei et al. | 463/11 |
| 8,272,961 B2 | 9/2012 | Busey et al. | 463/42 |
| 2001/0021670 A1 | 9/2001 | Miyamoto et al. | 463/43 |
| 2002/0128029 A1 | 9/2002 | Nishikawa et al. | |
| 2003/0107173 A1* | 6/2003 | Satloff et al. | 273/292 |
| 2003/0236119 A1 | 12/2003 | Forlines et al. | 463/41 |
| 2004/0003039 A1 | 1/2004 | Humphrey et al. | |
| 2005/0192071 A1 | 9/2005 | Matsuno et al. | 463/1 |
| 2007/0060315 A1* | 3/2007 | Park | 463/25 |
| 2007/0063033 A1* | 3/2007 | Silverbrook et al. | 235/432 |
| 2007/0099702 A1* | 5/2007 | Tupper | 463/42 |
| 2007/0155508 A1* | 7/2007 | Sun et al. | 463/42 |
| 2007/0232399 A1* | 10/2007 | Kathman et al. | 463/42 |
| 2008/0004116 A1* | 1/2008 | Van Luchene et al. | 463/42 |
| 2008/0141326 A1 | 6/2008 | Thompson et al. | |
| 2008/0287175 A1 | 11/2008 | Kusuda et al. | 463/17 |
| 2008/0293466 A1* | 11/2008 | Arakawa et al. | 463/7 |
| 2009/0149248 A1 | 6/2009 | Busey et al. | 463/29 |
| 2010/0264595 A1 | 10/2010 | Carey | 273/308 |
| 2011/0039609 A1* | 2/2011 | Agam | 463/9 |

OTHER PUBLICATIONS

On Mar. 28, '11 continuous Gacha' system implementation, online, SeedC. Inc., shown on Mar. 28, 2012, searched Aug. 30, 2012, http://www.webga.jp/information/detrail.php?id=21464+c=31>, 3 pages.

Alt Plus of "Legened of the Derby's King" Fantasy Roll Playing Game with 'GREE' starting provision of "Bahamutbrave" online, Social Game Info Inc, shown on Oct. 11, 2011, searched on Aug. 29, 2012, http:gamebiz.jp/?p=40640>, 4 pages.

SwordXSword, AppliSTYLE vol. 7, East Press, Mar. 1, 2012, Koiunreki March Extra Number, 6 pages.

Japanese Office Action dated Jun. 12, 2012, issued in Japanese Patent Application No. 2012-077353, 7 pages.

Japanese Office Action dated Sep. 4, 2012, issued in Japanese Patent Application No. 2012-174275, 4 pages.

Japanese Office Action dated Dec. 11, 2012, issued in Japanese Patent Application No. 2012-174275, 4 pages.

Knights of Crystal, Weekly Famitsu, Enterbrain Inc., Jul. 14, 2011, vol. 26, No. 31, Serial No. 1180, P. 70, 4 pages.

Extended European Search Report dated Nov. 13, 2013, issued in European Patent Application No. 13160471.2, 9 pages.

* cited by examiner

| CARD ID | CHARACTER NAME | CHARACTER IMAGE | RARITY | POINTS AWARDED BY SELLING | INITIAL (LV.1) ATTACK POWER | INITIAL (LV.1) DEFENSE POWER |
|---|---|---|---|---|---|---|
| 0001 | WARRIOR A | 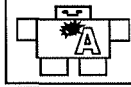 | COMMON | 300pt | 15 | 8 |
| 0002 | WARRIOR A | 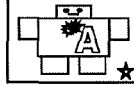 | UNCOMMON | 750pt | 20 | 15 |
| 0003 | WARRIOR A | 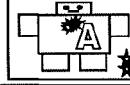 | RARE | 2000pt | 100 | 60 |
| 0004 | WARRIOR A | 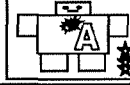 | SUPER RARE | 5000pt | 200 | 180 |
| 0011 | WARRIOR B |  | COMMON | 250pt | 10 | 5 |
| 0012 | WARRIOR B |  | UNCOMMON | 600pt | 15 | 10 |
| 0013 | WARRIOR B | 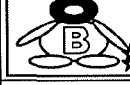 | RARE | 1500pt | 80 | 50 |
| ... | ... | ... | ... | ... | ... | ... |
| 2591 | WIZARD Z |  | COMMON | 450pt | 20 | 30 |
| 2592 | WIZARD Z |  | UNCOMMON | 1000pt | 50 | 75 |
| 2593 | WIZARD Z |  | RARE | 3000pt | 60 | 100 |
| 2594 | WIZARD Z |  | SUPER RARE | 6000pt | 150 | 300 |
FIG. 6

| USER ID | FRIEND USER ID | VIRTUAL CURRENCY | PLAY POINT | OWNED CARD INFORMATION | PICTORIAL BOOK INFORMATION |
|---|---|---|---|---|---|
| 1 | 5, 8 | 0 | 15000 | OWNED CARD INFORMATION(1) | PICTORIAL BOOK INFORMATION(1) |
| 2 | NONE | 500 | 6000 | OWNED CARD INFORMATION(2) | PICTORIAL BOOK INFORMATION(2) |
| 3 | 4, 6 | 700 | 50000 | OWNED CARD INFORMATION(3) | PICTORIAL BOOK INFORMATION(3) |
| 4 | 3, 6 | 1000 | 90000 | OWNED CARD INFORMATION(4) | PICTORIAL BOOK INFORMATION(4) |
| 5 | 1, 6 | 100 | 40000 | OWNED CARD INFORMATION(5) | PICTORIAL BOOK INFORMATION(5) |
| 6 | 3, 4, 5 | 3000 | 30000 | OWNED CARD INFORMATION(6) | PICTORIAL BOOK INFORMATION(6) |
| . | . | . | . | . | . |
| . | . | . | . | . | . |
| . | . | . | . | . | . |

FIG. 7

| OWNED CARD INFORMATION (2) | | | | |
| OWNED CARD INFORMATION (2) | | | | |
| OWNED CARD INFORMATION (1) | | | | |
| OWNED CARD ID | LEVEL | ATTACK POWER | DEFENSE POWER | ACQUISITION DATE/TIME |
| 0011 | LV. 3 | 15 | 10 | 2012/2/13 10:00:00 |
| 0211 | LV. 4 | 20 | 23 | 2012/2/13 12:00:1:30 |
| 0133 | LV. 1 | 70 | 45 | 2012/2/14 11:30:3:00 |
| 0201 | LV. 4 | 22 | 40 | 2012/2/15 18:00:3:30 |
| 0072 | LV. 7 | 60 | 50 | 2012/2/16 13:30:9:00 |
| 0094 | LV. 1 | 300 | 200 | 2012/2/16 19:00 |
| ... | ... | ... | ... | ... |

FIG. 8

| PICTORIAL BOOK INFORMATION (1) ||
|---|---|
| CARD ID | FLAG SHOWN |
| 0001 | TRUE |
| 0002 | FALSE |
| 0003 | FALSE |
| 0004 | FALSE |
| 0011 | TRUE |
| 0012 | TRUE |
| . | . |
| . | . |
| . | . |

FIG. 9

NON-TRANSITORY COMPUTER-READABLE RECORD MEDIUM, GAME SYSTEM AND INFORMATION PROCESSING DEVICE

CROSS-REFERENCE TO RELATED APPLICATIONS

This application is a continuation of U.S. application Ser. No. 13/851,569, filed Mar. 27, 2013, which claims priority upon Japanese Patent Application No. 2012-077353 filed on Mar. 29, 2013. The disclosures of the above-referenced applications are incorporated herein by reference in their entirety.

BACKGROUND

1. Technical Field

This invention relates to a non-transitory computer-readable record medium, a game system, and an information processing device.

2. Related Art

A game program is known that causes a computer to execute a game in which a user uses a game content such as character cards and the like (for example, Japanese Laid-Open Patent Publication No. 2008-264183).

With such a game program, game contents used in the game are offered to the user. The user had judged whether or not the user needed the offered medium and took the time and effort to perform a manipulated input according to the necessity or unnecessity.

SUMMARY

The present invention has been conceived in view of the above issue, and an object thereof is to relieve the time and effort required for the manipulated input.

An aspect of the invention to solve the above and other problems is a non-transitory computer-readable storage medium storing a game program for causing a computer including a processor and a memory to execute a game in which a user uses a game content, the game program instructing the computer to perform the following processes of
    an offering process to offer the game content to the user;
    a recording process to record an offered game content offered in the offering process, as an owned game content owned by the user;
    a reception process to receive a prearranged registration of a specified game content specified by an input from a user;
    a judgment process, when an offer game content is offered to a user in the offering process after the reception process, to compare the offered game content to the specified game content prearranged for registration, to judge whether or not the offered game content is to be made an owned game content of the user; and
    an update process to update a record of the owned game content owned by the user based on a judgment result in the judgment process.

Other features of this invention will become apparent from the description in the detailed description of the invention and the attached drawings.

BRIEF DESCRIPTION OF DRAWINGS

FIG. 6 illustrates an example of a data structure of card information.

FIG. 7 illustrates an example of a data structure of user information.

FIG. 8 illustrates an example of a data structure of owned card information.

FIG. 9 illustrates an example of a data structure of pictorial book information.

DETAILED DESCRIPTION OF THE INVENTION

Figure 1:
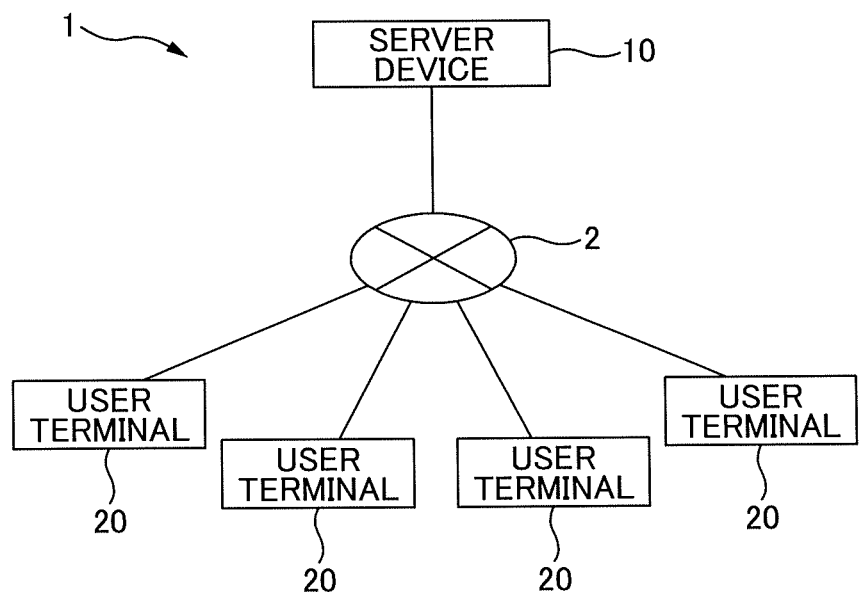
FIG. 1 is an example of an overall configuration of a game system 1 according to the present embodiment.

From the description in the detailed description of the invention and the accompanied drawings, at least the following matters will be apparent.

In other words, a non-transitory computer-readable storage medium storing a game program for causing a computer including a processor and a memory to execute a game in which a user uses a game content, the game program instructing the computer to perform the following processes of
    an offering process to offer the game content to the user;
    a recording process to record an offered game content offered in the offering process, as an owned game content owned by the user;
    a reception process to receive a prearranged registration of a specified game content specified by an input from a user;
    a judgment process, when an offer game content is offered to a user in the offering process after the reception process, to compare the offered game content to the specified game content prearranged for registration, to judge whether or not the offered game content is to be made an owned game content of the user; and
    an update process to update a record of the owned game content owned by the user based on a judgment result in the judgment process.

According to such a game program, since the necessity or unnecessity of the offered game content is automatically judged by the user registering in advance the designated game content designated by the user, the time and effort for performing a manipulated input can be saved.

Further, the computer-readable storage medium storing a game program, wherein the game program instructs the computer to perform
    a process to judge whether a number of owned game contents of the user in the judgment process has reached a predetermined number when the offered game content is offered to the user in the offering process, and to keep the offered game content from becoming an owned game content owned by the user when a judgment has been made that the predetermined number has been reached.

According to such a game program, the time and effort for performing a manipulated input can be saved since the number of owned game contents owned by the user is limited automatically.

Further, the computer-readable storage medium storing a game program, wherein the game program instructs the computer to perform a process to offer at one time a plurality of the game contents to the user, in the offering process;

a process to judge by comparing each of the plurality of the offered game contents offered at one time to the specified game content prearranged for registration, to judge whether or not each of the plurality of the offered game contents is to be made an owned game content of the user, in the judgment process; and a process to update a record of the owned game content owned by the user based on the judgment result, in the update process.

According to such a game program, the time and effort for performing a manipulated input can be further saved since the necessity or unnecessity of each offered game content is automatically judged even when a plurality of offered game contents are offered at one time.

Further, the computer-readable storage medium storing a game program, wherein the game program instructs the computer to perform, when a combination game content that forms a predetermined combination exists in the plurality of the offered game contents offered to the user in the offering process, a process to judge whether or not the combination game content is to be made an owned game content of the user by comparing the combination game content to the specified game content prearranged for registration, in the judgment process, and a process to update a record of the owned game content owned by the user so as to make the combination game content an owned game content owned by the user even when a judgment is made to keep the combination game content from becoming an owned game content owned by the user, in the update process.

According to such a game program, since the combination game content can be automatically made an owned game content of the user, the user can form a certain combination.

Further, the computer-readable storage medium storing a game program, wherein the game program instructs the computer to perform, when a prearranged registration is received, to make a game content having an attribute specified by an input from the user the specified game content, in the reception process, a process to judge whether or not to make the offered game content an owned game content of the user, by comparing an attribute of the offered game content to an attribute of the specified game content prearranged for registration, when an offer game content having an attribute is offered to a user in the offering process after the reception process, in the judgment process, and a process to update a record of the owned game content owned by the user based on the judgment result, in the update process.

According to such a game program, since the necessity or unnecessity of the offered game content having an attribute is automatically judged by the user registering in advance the game contents with the attribute specified by the user, allows the time and effort for performing a manipulated input to be saved.

Further, the computer-readable storage medium, wherein the game program instructs the computer to perform when a judgment is made to keep an offered game content from becoming an owned game content owned by a user, in the judgment process, a point offering process to convert the offered game content to a play point equivalent to a value of the offered game content and offer the play point to the user.

According to such a game program, since the play point is converted automatically when the offered game content is determined to be kept from becoming an owned game content, allows the time and effort for performing a manipulated input to be saved.

Further, the computer-readable storage medium storing a game program, wherein the game program instructs the computer to perform a history recording process to record history information of the owned game content that has ever been owned by the user; and a process to receive a prearranged registration of the specified game content when a specified game content specified by the user matches the owned game content included in the history information, in the reception process.

According to such a game program, the necessity or unnecessity of a game content that has never been owned can be certainly judged by the user since only game contents that has ever been owned by the user are prearranged for registration as specified game contents.

Further, the computer-readable storage medium storing a game program, wherein the game program instructs the computer to perform when a judgment is made to keep an offered game content from becoming an owned game content owned by a user, in the judgment process, a process to make the offered game content an owned game content owned by an other user different from the user and update a record of the owned game contents owned by the other user.

According to such a game program, the enjoyment between users can be increased since users can communicate with each other.

Further, the game system including a user terminal used by a user and a server device connected to the user terminal over a network, and allowing the user to play a game in which a game content is used, the user terminal including, an input unit with which a user performs an input; and a communication unit that transmits to the server device over the network, a prearranged registration request to request for a prearranged registration of a specified game content specified by an input from the user, the server device including, an offering unit that offers to the user the game content;

a recording unit that records an offered game content offered by the offering unit, as an owned medium owned by the user;

a reception unit that receives a prearranged registration of the specified game content by receiving the prearranged registration request transmitted from the user terminal;

a judging unit that judges, when an offer game content has been offered to a user after reception by the reception unit, whether or not the offered game content is to be made an owned game content of the user by comparing the offered game content to the specified game content prearranged for registration; and an updating unit that updates a record of the owned game contents owned by the user, based on a judgment result produced by the judging unit.

According to such a game system, the time and effort for performing a manipulated input can be saved.

Further, an information processing device allowing a user to play a game using a game content, the information processing device including an offering unit that offers to the user the game content;
a recording unit that records an offered game content offered by the offering unit, as an owned medium owned by the user;
an input unit with which a user performs an input;
a reception unit that receives a prearranged registration of a specified game content specified by an input from the user;
a judging unit that judges, when an offer game content has been offered to a user after reception by the reception unit, whether or not the offered game content is to be made an owned game content of the user by comparing the offered game content to the specified game content prearranged for registration; and
an updating unit that updates a record of the owned game contents owned by the user, based on a judgment result produced by the judging unit.

According to such an information processing device, the time and effort for performing a manipulated input can be saved.

Present Embodiment

Configuration of Game System 1

FIG. 1 is an example of an overall configuration of a game system 1 according to the present embodiment. The game system 1 according to the present embodiment provides various types of services related to games to a user who has been registered as a member over a network 2. The user can play a game transmitted over the network 2 by accessing the game system 1. The user can also register other users as friends on a friend list by accessing the game system 1. In this way, the game system 1 encourages communication between a plurality of users by allowing the users to play games and exchange messages with users who have become friends.

The game system 1 according to the present embodiment includes a server device 10 and a plurality of user terminals 20. The server device 10 and the user terminals 20 are each connected to the network 2 and are able to communicate with each other. The network 2 is, for example, the Internet, a local area network (LAN), or a value added network (VAN) established by Ethernet (trademark) or a public switched telephone network, a radio communication network, or a mobile phone network.

The server device 10 is an information processing device used by a person such as a system administrator when managing and controlling the game service. The server device 10 is, for example, a workstation or personal computer and is able to distribute various types of information to the user terminals 20 in response to various commands (requests) transmitted from those user terminals 20. When a distribution request for contents is received from a user terminal 20 used by a user playing a game, the server device 10 according to the present embodiment is able to distribute in accordance with the request the following contents: a game program that is operable on the user terminal 20; a web page which is generated by a mark-up language (HTML and the like) suited to the standards of the user terminal; and the like.

The user terminal 20 is an information processing device used by a user when playing a game. The user terminal 20 may be, for example, a mobile telephone terminal, a smartphone, a personal computer, or a game device and the like. The user terminal 20 is able to send a distribution request for various types of information (e.g., contents such as game programs and web pages) related to the game to the server device 10 that is accessible over the network 2. The user terminal 20 also has a web browser function for allowing users to view web pages. Therefore, when web pages (e.g., game play images) linked to, for example, image data related to a game are distributed from the server device 10, the user terminals 20 are able to display the web pages on screens.

Configuration of Server Device 10

Figure 2:
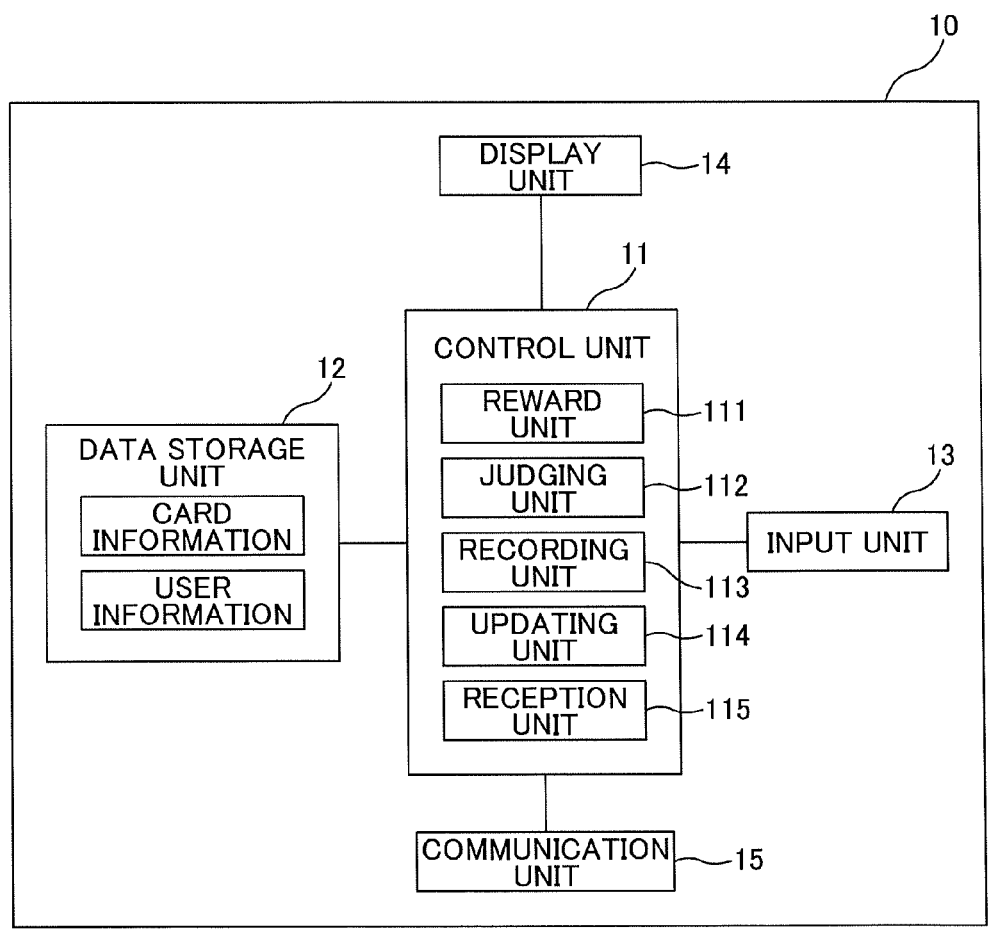
FIG. 2 is a block diagram of a functional configuration of a server device 10 according to the present embodiment.

FIG. 2 is a block diagram of a functional configuration of a server device 10. The server device 10 according to the present embodiment includes a control unit 11, a data storage unit 12, an input unit 13, a display unit 14, and a communication unit 15.

The control unit 11 is a unit that transfers data among the units and controls the entire server device 10, and is realized by a central processing unit (CPU) executing a program stored in a certain memory. Specifically, the control unit 11 has a function to execute various controls and information processes related to the game system 1 such as various processes to provide a game service and various processes to respond to requests from the user terminals 20. To be more specific, the control unit 11 according to the present embodiment includes an offer unit 111, a judging unit 112, a recording unit 113, an updating unit 114, and a reception unit 115 as shown in FIG. 2.

The offer unit 111 has a function to perform a process for offering a game content used in a game to a user. A game content refers to digital contents, for example, a game card, a figure and the like that are associated with a character.

The judging unit 112 has a function to perform a process for judging whether or not a game content offered by the offer unit 111 is to be owned by a user.

The recording unit 113 is connected to the data storage unit 12 over the bus and has a function to perform a process for recording data into the data storage unit 12 according to a command from the control unit 11.

The updating unit 114 is connected to the data storage unit 12 over the bus and has a function to perform an update process such as rewriting data stored in the data storage unit 12 in response to a command from the control unit 11.

The reception unit 115 has a function to perform a process for receiving a prearranged registration relating to a judgment condition for judging the necessity or unnecessity of a game content.

The data storage unit 12 has a read only memory (ROM) and a random access memory (RAM): the ROM is a read-only storage region in which system programs for the server device 10 are stored, and the RAM is a rewritable storage region in which various types of data (flags and computed values used by the system program) generated by the control unit 11 are stored and which is used as a work area for computing processes performed by the control unit 11. The data storage unit 12 is realized, for example, by a non-volatile storage device such as a flash memory or a hard disk and the like. The data storage unit 12 according to the present embodiment stores card information and user information: the card information is information related to a game card used by a user in a game and the user information is information related to the user. These pieces of information will be described later in detail.

The input unit 13 is a unit with which a system administrator, etc. input various types of data (the following card information and the like), and is realized by a keyboard, a mouse, and the like.

The display unit 14 is a unit which displays operating screens for the system administrator according to commands from the control unit 11, and is realized, for example, by a liquid crystal display (LCD) and the like.

The communication unit 15 is a unit for performing communication with the user terminals 20, and has a function as a reception unit for receiving signals and various data transmitted from the user terminals 20, and a function as a transmission unit for transmitting the signals and various data to the user terminals 20 in accordance with commands from the control unit 11. The communication unit 15 is realized, for example, by a network interface card (NIC) and the like.

Configuration of User Terminal 20

Figure 3:
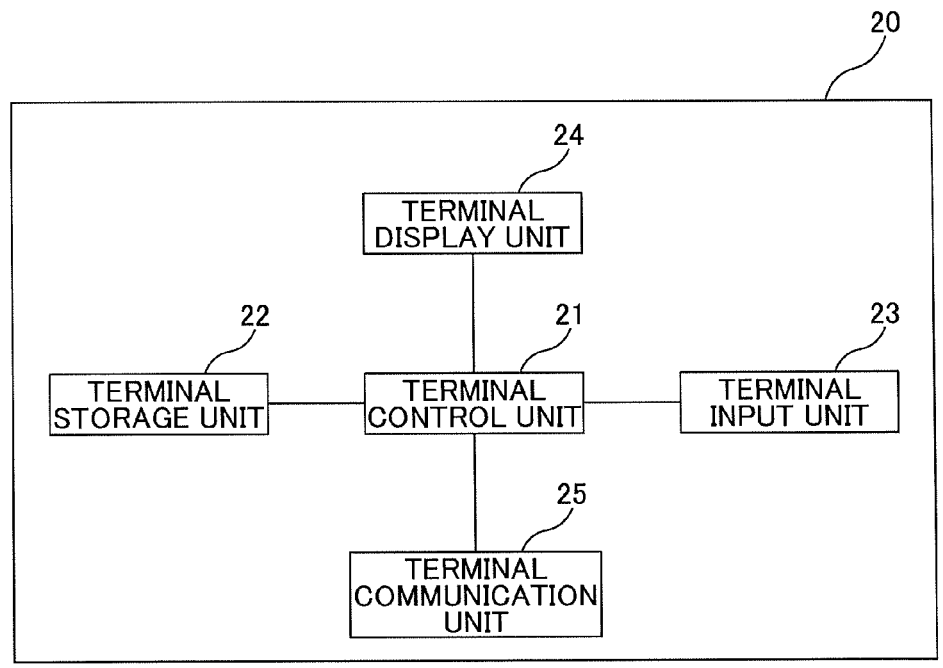
FIG. 3 is a block diagram of a functional configuration of a user terminal 20 according to the present embodiment.

FIG. 3 is a block diagram of a functional configuration of a user terminal 20. The user terminal 20 according to the present embodiment includes a terminal control unit 21, a terminal storage unit 22, a terminal input unit 23, a terminal display unit 24, and a terminal communication unit 25.

The terminal control unit 21 is a unit that transfers data among the units and controls the entire user terminal 20. The terminal control unit 21 is realized by a central processing unit (CPU) executing a program stored in a certain memory. Specifically, the terminal control unit 21 has a function to execute various controls and information processes related to the game system 1 such as various processes for accessing a game site, and various processes for sending requests to the server device 10.

The terminal storage unit 22 has a read only memory (ROM) a random access memory (RAM): the ROM is a read-only storage region in which system programs for the user terminal 20 are stored; and the RAM is a rewritable storage region in which various types of data (flags and computed values used by the system program) generated by the terminal control unit 21 are stored and which is used as a work area for computing processing by the terminal control unit 21. The terminal storage unit 22 is realized, for example, by a non-volatile storage device such as a flash memory or a hard disk and the like. The terminal storage unit 22 is connected to the terminal control unit 21 through a bus. In accordance with commands from the terminal control unit 21, the data stored in the terminal storage unit 22 is looked up, read, and rewritten. In the present embodiment, the terminal storage unit 22 records user IDs and the following contents which are transmitted from the server device 10: game programs; game data; and the like.

The terminal input unit 23 is a unit with which the user performs various operations (game operations, text input operations, and the like), and is realized, for example, by an operating button, a touchscreen or the like.

The terminal display unit 24 is a unit for displaying a game screen (game play image) generated based on game information according to commands from the terminal control unit 21, and is realized, for example, by a liquid crystal display (LCD) and the like.

The terminal communication unit 25 is a unit that performs communication with the server device 10, and has a function as a reception unit for receiving signals and various data transmitted from the server device 10, and a function as a transmission unit for transmitting the signals and various data to the server device 10 in accordance with commands from the terminal control unit 21. The terminal communication unit 25 is realized, for example, by a network interface card (NIC) and the like.

Game Outline

An outline of the game provided by the game system 1 is described below.

The game system 1 according to the present embodiment is able to provide users with a battle game and the like that are played using a game content. The following describes a battle card game that is played using a game card as one example of the game content. Note that this game card serves as digital content, namely a virtual card used in a virtual space in the game.

Battle Card Game

The game system 1 according to the present embodiment is able to provide a battle game that determines an outcome by allowing a character selected by a user to battle with an enemy character, i.e. an adversary.

In this battle game, the user first selects a character to battle with the enemy character. In the present embodiment, the user is able to own a plurality of game cards (virtual cards used in a virtual space in the game). The game cards are each associated with a game character. Thus, when the user selects a game card to be used in the battle from the game cards that the user owns, the character associated with the selected game card is set as the character to battle with the enemy character.

Next, a battle game is started in which the character selected by the user battles with the enemy character. Specifically, the system is set such that, when a user inputs a command to perform an attack, then the user's character attacks the enemy character in accordance with the input command, and the enemy character performs a counter-attack to resist the attack. The outcome in the battle game is determined based on a life parameter (hit point parameter) which is set for each character. In other words, the battle game is programmed so that as the value of the life parameter (hit point parameter) is reduced in accordance with attacks by an adversary, the character whose value reaches zero first is defeated.

When the battle game ends with the outcome of the game determined in this way, game cards and play points are offered to the user based on the contents and outcomes of the battle. Therefore, the user can increase the number of the user's owned game cards and play points by performing this battle card game.

Selling Game Cards

As described above, the user can make the game card offered based on the outcome of the battle card game (hereinafter "offered card") a game card owned by himself/herself (hereinafter "owned card"). However, when the offered card is a game card same as an owned card already owned by the user, or when the offered card is a game card of a character with a low skill value, the game card tends to be judged as an unnecessary game card by the user.

Therefore, unnecessary cards can be kept from becoming an owned card in this game system 1. In the present embodiment, the user can own only necessary cards without owning unnecessary game cards by selling unnecessary game cards. When unnecessary game cards are sold, the value of the particular unnecessary game card is converted to a play point equivalent thereto. The play point is a point that can be can be exchanged with a bonus offered in the game.

In the game system 1 of the present embodiment, unnecessary game cards can be sold by an operation of the user (manual selling) or unnecessary game cards can be sold automatically without an operation of the user (automatic selling). The user can select an appropriate way of selling according to the circumstances and the like.

Figure 4:
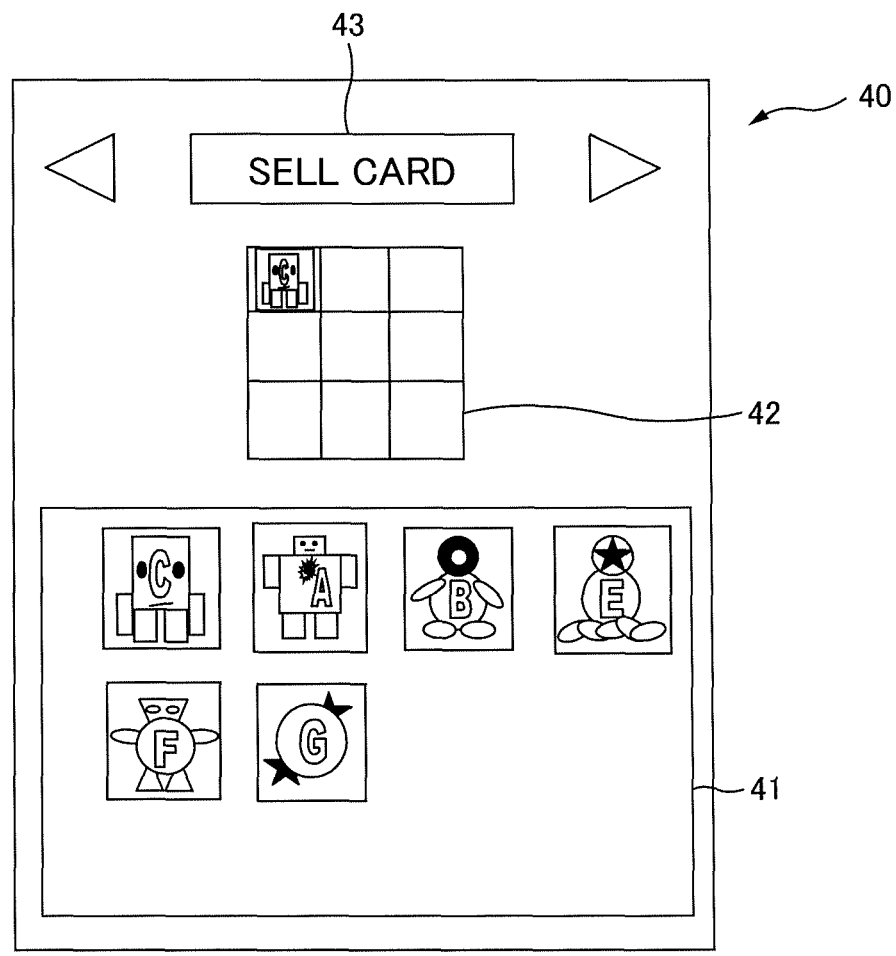
FIG. 4 illustrates an example of a play image when selling a game card.

Here, description will be given of the case where the former way of selling is selected by the user. As shown in FIG. 4, the user makes a play image 40 (operation screen) for selling a game card to be displayed on the terminal display 24 of the user terminal 20. And the user arranges the owned card owned by himself/herself in the owned card area 41 by operating the terminal input unit 23. Six owned cards are arranged in the owned card area 41 in the present embodiment. The user operates the terminal input unit 23 to select the card that has become an unnecessary owned card among the six owned cards displayed in the owned card area 41. When the owned card that has become unnecessary is selected by the user, the unnecessary owned card is arranged in the sell card area 42. And after checking that the unnecessary owned card is displayed in the sell card area 42, the user presses the sell card button 43. Selling of an unnecessary owned card is confirmed by such input operation performed by the user. The play point equivalent to the value of the particular unnecessary owned card is offered to the user when the selling of the unnecessary owned card is confirmed.

When the former way of selling is selected by the user, although the user can judge whether the game card is necessary or not and certainly sell the unnecessary game card in the above manner, the operation for selling the unnecessary owned card would become complicated as described above.

Compared to this, when the latter way of selling is selected, the user can automatically sell game cards without a manipulated input when an unnecessary game card is offered by prearranging registration of the unnecessary game card. Therefore, the time and effort for a manipulated input to sell an unnecessary owned card can be saved. Note that, the specific procedures for automatically selling an unnecessary game card will be described later.

Combining Game Cards

As described above, the user can win play points based on the outcome of the battle card game in this game system 1. Additionally, the user can achieve play points by selling unnecessary game cards. In the present embodiment, when the user has saved up to a certain number of play points, by combining game cards (composing game cards) that form a certain combination from a plurality of owned cards owned by the user, the user can change the capability value (parameter) of the character correlated with a game card obtained after composition. Therefore, when a game card that forms a certain combination is offered, the user has a tendency to be willing to own the card rather than sell the card as an unnecessary game card.

In the game system 1 of the present embodiment, game cards can be composed by combining game cards of the same category or by combining game cards of different categories.

Figure 5:
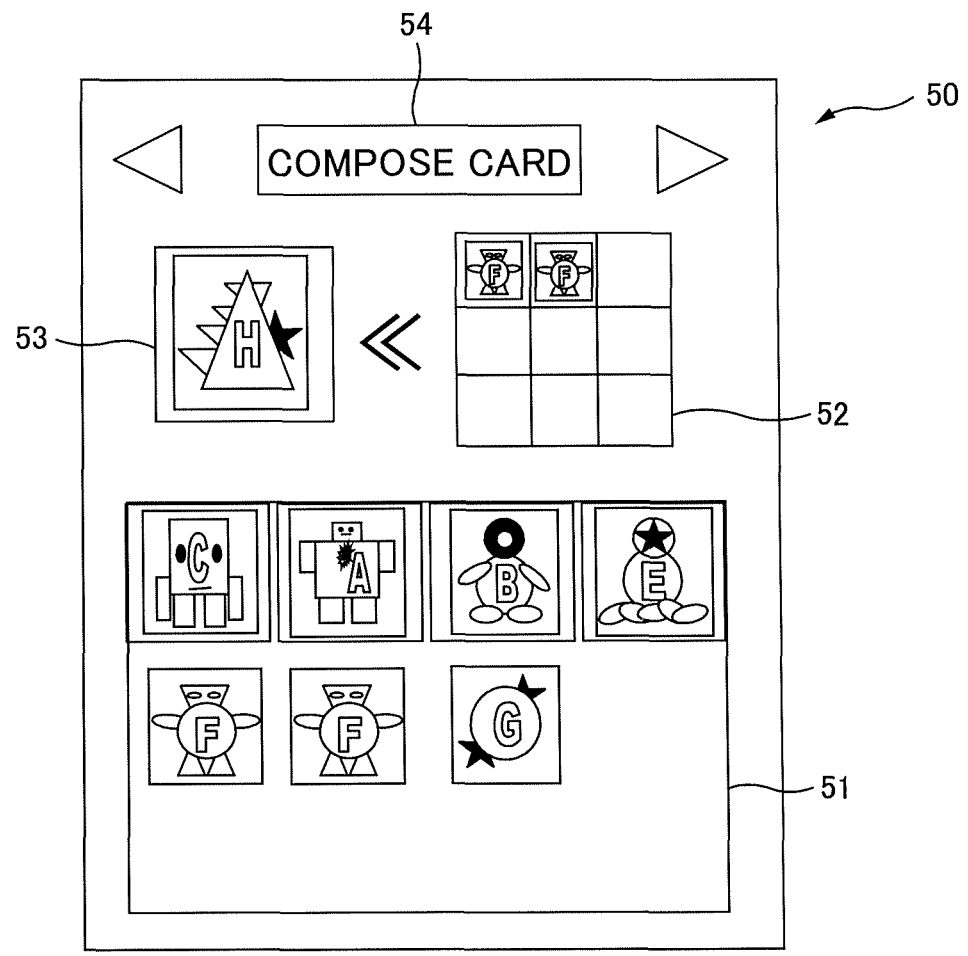
FIG. 5 illustrates an example of a play image when composing a game card.

Here, description will be given of a case where a game card is composed by combining game cards of the same category. As shown in FIG. 5, the user displays a play image 50 (operation screen) for composing a game card on the terminal display unit 24 of the user terminal 20. And the user arranges the owned cards owned by himself/herself in the owned card area 51 by operating the terminal input unit 23. In the present embodiment, seven owned cards are arranged in the owned card area 51. The user selects the owned cards of the same category from the seven owned cards displayed in the owned card area 51 by operating the terminal input unit 23. When owned cards of the same category are selected by the user, the owned cards are arranged in the pre-composition card area 52 and the appearance of an owned card created after composition is arranged in the post-composition card area 53. And the user checks that the owned card of the same category are displayed in the pre-composition area 52 and checks the owned card created after composition in the post-composition card area 53 as well, and presses the compose card button 54. Owned cards of the same category selected by the user are composed by the user performing such input operation. Specific procedures for composing a game card will be described later.

Random Selection Game

In the game system 1 of the present embodiment, a random selection game can be played by the user paying a virtual currency. In the present embodiment, a certain amount of virtual currency is offered to the user periodically.

This random selection game is a game where a game card randomly selected from a plurality of game cards is offered to the user. The user uses the offered card offered in this random selection game to play the aforementioned battle card game. The so-called Gacha Gacha (registered trademark) random selection game is played in the present embodiment.

In the game system 1 of the present embodiment, the user can selectively play between a common random selection game where one game card randomly selected from a plurality of game cards is offered to the user for one random selection game, and a special random selection game where a plurality of game cards randomly selected from a plurality of game cards are offered to the user for one random selection game.

In the special random selection game of the present embodiment, 10 game cards are offered to the user for one random selection game. Therefore, the user can increase the number of owned game cards owned by himself/herself at once by playing this random selection game.

Although the number of owned game cards increase by a plurality of game cards being offered at one time, there are cases where many game cards unnecessary for the user are offered at one time to the user.

Therefore, in this game system 1, the unnecessary game cards can be sold when the offered game cards are those unnecessary for the user, similar to the battle card game.

Note that, when the game cards offered in the random selection game are game cards that form a certain combination, the game cards can be composed.

Data Structure

The various types of information used in the game system 1 of the present embodiment will be described with reference to FIGS. 6 to 9. FIG. 6 illustrates an example of a data structure of card information. FIG. 7 illustrates an example of a data structure of user information. FIG. 8 illustrates an example of a data structure of owned card information. FIG. 9 illustrates an example of a data structure of pictorial book information.

At least card information and user information are stored in the data storage unit 12 in the server device 10 in the present embodiment.

Card Information

The card information includes: a card ID which is one example of identification information for identifying a game card; and various types of information related to the game card associated with the card ID.

For example, as illustrated in FIG. 6, the card information includes the name of the character associated with the game card, the image of the character, rarity, points offered by selling and various types of initial parameters such as initial attack power and initial defense power.

The characters are named according to the category of the character and the category of the character can be identified by the user. As shown in FIG. 6, warrior characters such as "Warrior A" and "Warrior B" and wizard characters such as "Wizard Z" are set as the category (job category) of the characters in the present embodiment. Specifically, the third digit of the card ID is set to "0" for the warrior characters and the third digit of the card ID is set to "5" for wizard characters.

A character image is image data related to the character. Since a play image including a character is made to be displayed on the screen based on this image data, the category of the character can be recognized by the user.

Rarity is a parameter that indicates how rare the character is. Four levels of rarity (common, uncommon, rare and super rare) can be set to the character in the present embodiment. The user can enjoy an advantage when playing a battle game by owning a character (game card) of high level of rarity. The first digit of the card ID is set to "1" when the rarity is "common" in the present embodiment as shown in FIG. 6. The first digit of the card ID is set to "2" when the rarity is "uncommon", the first digit of the card ID is set to "3" when the rarity is "rare", and the first digit of the card ID is set to "4" when the rarity is "super rare".

A point offered by selling is the play point offered to the user when the user sells a game card. A point is set to each game card according to the value of the game card (value of the character) in the present embodiment. In other words, the point offered by selling is set higher as the level of rarity of the game card (character) increases.

Various types of initial parameters such as initial attack power and initial defense power are data that indicate the initial skill value set to the character. A higher initial parameter is set to a character as the rarity level increases in the present embodiment.

User Information

The user information includes: a user ID which is one example of identification information for identifying a user; and various types of information related to the particular user associated with the user ID.

For example, as illustrated in FIG. 7, the user information includes: the friend user IDs; virtual currency; play points; owned card information; pictorial book information; and the like.

Friend user IDs are information indicative of other users who have been registered on a friend list of the user. That is to say, the larger the number of friend user IDs is, the larger the number of other users with whom the user have become friends is. The friend user IDs are updated when the user registers other users on the friend list, and when the user deletes other users who have already been registered from the friend list.

The virtual currency is information indicative of the amount of virtual currency owned by the user. The virtual currency is updated when the user earns or spends virtual currency.

The play point is information indicative of the amount of play points owned by the user. The play point is updated when the play points are won or when the play points are used by the user.

The owned card information is information indicative of cards owned by the user. The owned card information includes: owned card IDs indicative of cards owned by the user; and various types of information related to the owned cards associated with the owned card IDs.

For example, as illustrated in FIG. 8, the owned card information includes: the levels of characters associated with game cards with the owned card IDs; various types of parameters such as attack power and defense power; acquisition dates and times when the user acquired the owned cards; and the like.

The levels are information indicative of the levels of the characters associated with the game cards with the owned card IDs. Various types of parameters such as attack power and defense power are data indicative of skill values set for the characters. These levels and various types of parameters such as attack power and defense power are changed and updated in accordance with the outcome of the battle card game. The acquisition dates and times are information indicative of the dates and times when the user acquired the owned cards.

The pictorial book information is history information indicative of history of owned cards that has ever been owned by the user until now. This pictorial book information includes: card IDs of owned cards that has ever been owned by the user until now; flag information associated with this card ID: and the like as illustrated in FIG. 9. "TRUE" is set to the card ID of a game card that has ever been owned until now and "FALSE" is set to the card ID of a game card that has never been owned, in the present embodiment.

Operation examples of the game system 1 of the present embodiment using these information will be specifically described in the following.

Operation of Game System 1

Overall Operation

The following describes an overall operation of the game system 1. In the game system 1 according to the present embodiment, the units are controlled and the processes are performed by causing the server device 10 and the user terminals 20 to cooperate based on a game program.

Specifically, a card offering process, a card recording process, a card selling process, a card composing process, and a card history recording process are performed in this game system 1. Description of the processes will follow.

Card Rewarding Process

The card offering process is a process for offering game cards to the user. Game cards are offered to the user by executing battle games or random selection games in the present embodiment. Specifically, the offer unit 111 in the server device 10 executes a game process relating to a battle game to determine the game card to be offered to the user based on the contents and outcomes of the battle. Further the offer unit 111 executes a game process relating to the random selection game to determine the game card to be offered to the user using random numbers.

Here, a detailed description will be given taking the battle card game as an example.

First, a web page accessed by the user for starting the battle game is displayed on the terminal display unit 24 of the user terminal 20 and the battle game is started by the user operating the terminal input unit 23. Specifically, when the terminal control unit 21 receives an input signal to start the battle from the terminal input unit 23, the terminal control unit 21 sets the user ID to a command for starting the battle game (battle start request) and transmits the command to the server device 10 through the terminal communication unit 25.

The user at this time can select a game card, in other words, select a character correlating with the game card to be used in the battle game. The character selected by the user becomes the character to battle with the enemy character in the virtual space in the game. Therefore, when the character is selected by the user operating the terminal input unit 23 (hereinafter, user character), the terminal control unit 21 reads the card ID of the game card corresponding to the selected character from the terminal storage unit 22 and transmits the read card ID and the user ID to the server device 10 through the terminal communication unit 25.

Next, when the server device 10 receives the battle start request which is provided with the user ID, the server device 10 determines the enemy character that participates in the battle with the user character.

Next, when the enemy character is determined, the server device 10 performs the battle game process to determine the outcome of the battle game between the characters. Specifically, based on the owned card information illustrated in FIG. 8, the control unit 11 (offer unit 111) acquires parameters such as the attack powers, defense powers, and hit points which are set for the user character. Also, the control unit 11 acquires parameters such as the attack power, defense power, and life (HP) which are set for the enemy character.

The control unit 11 (offer unit 111) calculates the amount of damage which the user character give to the enemy character, based on the parameters such as the attack power and defense power which are set for the user character. Then, the control unit 11 reduces, in accordance with the damage, the life parameter set for the enemy character. Similarly, the control unit 11 calculates the amount of damage which the enemy character gives to the user character, based on the parameters such as the attack power and defense power which are set for the enemy character. Then the control unit 11 reduces, in accordance with the damage, the hit point parameters set for the user character.

When the control unit 11 (offer unit 111) assesses that the life parameter of the enemy character has reached zero first as a result of this calculation, the control unit 11 determines that the enemy character is defeated (the user character has won). When the control unit 11 assesses that the hit point parameter of the user character have reached zero first, the control unit 11 determines that the user character is defeated (the enemy character has won).

When the outcome of the battle game is determined in this way, the control unit 11 (offer unit 111) selects the game card to be offered to the user from a plurality of game cards included in the card information indicated in FIG. 6 based on the contents and outcomes of the battle. Then the selected offer card becomes the user's owned card.

Card Recording Process

The card recording process is a process for recording the offer card offered to the user in the card offering process as an owned card to be owned by the particular user. The recording unit 113 in the server device 10 additionally records the offer card offered to the user in the card offering process in the owned card information shown in FIG. 8. Specifically, the recording unit 113 records the offer card as an owned card by the CPU writing information relating to the offer card in the storage area of the memory. Note that, the offer card may be recorded as an owned card by the CPU setting flag information (setting a flag indicative of owning) in the card ID correlating with the offer card.

Card Selling Process

The card selling process is a process for selling game cards that are unnecessary to the user. Manual card selling processes and automatic card selling processes are performed in the card selling process of the present embodiment.

The manual card selling process is a process that has unnecessary cards selected by a user's operation kept from becoming the user's owned cards. In other words, the card selling process is a process where the recording unit 113 of the server device 10 does not record unnecessary game cards in the owned card information indicated in FIG. 8. Specifically, unnecessary game cards are excluded from the user's owned cards by the CPU not writing information relating to the unnecessary cards in the storage area of the memory. Note that, unnecessary game cards may be excluded from the user's owned cards by the CPU setting flag information (setting a flag indicative of non-owned) in the card ID correlating with the unnecessary game card.

The automatic card selling process is a process that keeps unnecessary cards from becoming the user's owned cards automatically without relying on a user's operation. In other words, the card selling process is a process where the judging unit 112 of the server device 10 judges whether or not the game card offered in the card offering process is necessary or not and the recording unit 113 of the server device 10 does not record the game card judged to be unnecessary by the judging unit 112 in the owned card information indicated in FIG. 8. Specifically, the unnecessary game card is excluded from the user's owned card by the CPU not writing information related to the unnecessary game card in the storage area of the memory. Note that, unnecessary game cards may be excluded from the user's owned cards by the CPU setting flag information (setting a flag indicative of not-owned) in the card ID correlating with the unnecessary game card. This automatic card selling process is different from the manual card selling process in that the user is required to make a prearranged registration process for specifying and registering in advance game cards that are thought to be unnecessary to the user since the user's operation for selecting unnecessary game cards does not intervene. Thereby, the judging unit 112 automatically judges whether the game card is necessary or not by the judging unit 112 comparing the game card with the game cards specified in advance so that the user does not have to perform an operation for selecting the unnecessary game card to sell and thus allowing time and effort required for a manipulated input to be relieved. Note that, this automatic card selling process will be described in detail later.

Additionally, a point offering process for offering points to the user by exchanging unnecessary game cards to play points is performed together with the process that keeps unnecessary cards from becoming the user's owned cards in the card selling process of the present embodiment. Specifically, points offered by selling are correlated with each character (card ID) in the card information stored in the data storage unit 12. And the control unit 11 in the server device 10 acquires the points offered by selling correlated with the card ID of the unnecessary game card by referring to the card information. Then the control unit 11 adds the acquired points offered by selling as play points to be offered to the user, to the user information stored in the data storage unit 12 and updates the play points as shown in FIG. 2 and FIG. 7.

Card Composition Process

The card composition process is a process for forming one game card by combining a plurality of game cards. The control unit 11 of the server device 10 starts a card composition process upon reception of an operation signal from the user terminal 20 indicating a request to combine game cards. Detailed description of the card composition process will follow.

The control unit 11 in the server device 10 transmits the play image (see FIG. 5) to be displayed on the terminal display unit 24 of the user terminal 20 to the user terminal 20 over the network, in the present embodiment.

The terminal control unit 21 of the user terminal 20 has the terminal display unit 24 display the received play image (see FIG. 5) and has the user select the game cards that form a certain combination. The user operates the terminal input unit 23 to select a plurality of game cards (e.g., selects two owned cards) that form a certain combination (hereinafter, combination cards) from a plurality of owned cards. The terminal control unit 21, in response to an operation signal for selecting game cards received from the terminal input unit 23, transmits the card ID of the combination cards selected by the user to the server device 10 as well as sets a user ID to the command (card composition request) for composing combination cards to transmit to the server device 10.

Next, the server device 10 checks whether the play points owned by the user is equal to or more than a predetermined number of points in response to the received card composition request to which the user ID is set. In other words, the control unit 11 of the server device 10 refers to the user information (see FIG. 7) stored in the data storage unit 12 with the user ID set to the received card composition request as the key to judge whether or not the play points that has associated the particular user ID is equal to or more than a predetermined number of points. The control unit 11 authorizes the composition of the combination cards selected by the user when the particular play points are equal to or more than a predetermined number of points.

Next, the server device 10 generates game cards by composing the combination cards selected by the user. Specifically, the control unit 11 of the server device 10 sets any one of the game cards among the plurality of combination cards received from the user terminal 20 as the main card and sets the remaining cards as sub-cards. Then the control unit 11 acquires skill parameters such as level, attack power and defense power of the main card by referring to the owned card information (see FIG. 8) with the card ID of the main card as the key. The control unit 11 performs an update by changing the acquired skill parameter to a new skill parameter and recording the changed skill parameter into the owned card information of the main card.

When the skill parameter is changed in this way, the control unit 11 judges whether or not the combination card selected by the user forms a predetermined combination. In other words, the control unit judges whether the main card and the sub cards are game cards that belong to the same category or game cards that belong to a different category. Specifically, the control unit 11 makes a judgment based on the card ID of the game card. As shown in FIG. 6, the game cards having card IDs 0001 to 0004 are game cards belonging to the same category and are set as character name "Warrior A", in the present embodiment. Additionally, the game cards having card IDs 2591 to 2594 are game cards belonging to the same category and are set as character name "Wizard Z". In other words, game cards having card IDs 0001 to 0004 (Warrior A) and game cards having card IDs 2591 to 2594 (Wizard Z) are set as game cards that belong to different categories. In this way, the control unit 11 judges whether the game cards belong to the same category or a different category based on the card ID of the main card and the sub-card. And when the control unit 11 judges that the main card and the sub-card belong to the same category, changes the skill parameter so that the skill parameter becomes higher than in the case the main card and the sub-card belong to a different category. Therefore, even when a game card of the same category as that of a game card already owned by the user is offered, the user is motivated to own the card rather than sell the offered card as an unnecessary game card.

Subsequently, the control unit 11 sets the main card as the composed game card by deleting the sub-cards from the owned card information (see FIG. 8). In other words, one of the combination cards selected by the user is deleted and the other becomes the composed game card after composition of the game cards.

Note that description was given of a case where the control unit 11 automatically sets the main card and the sub-cards as an example above, however, the main card and the sub-cards may be selected by the user.

Card History Recording Process

The card history recording process is a process for recording history of game cards that has ever been owned by the user. History information of game cards that has ever been owned by the user is recorded in user information (see FIG. 7) as pictorial book information in the present embodiment. Since pictorial book information has flag information indicative of owned or not owned correlated to the card ID of the game card, the control unit 11 of the server device 10 can refer to this flag information to judge whether or not the game card correlating to the card ID has ever been owned by the user.

Regarding Automatic Card Selling Process

Figure 10:
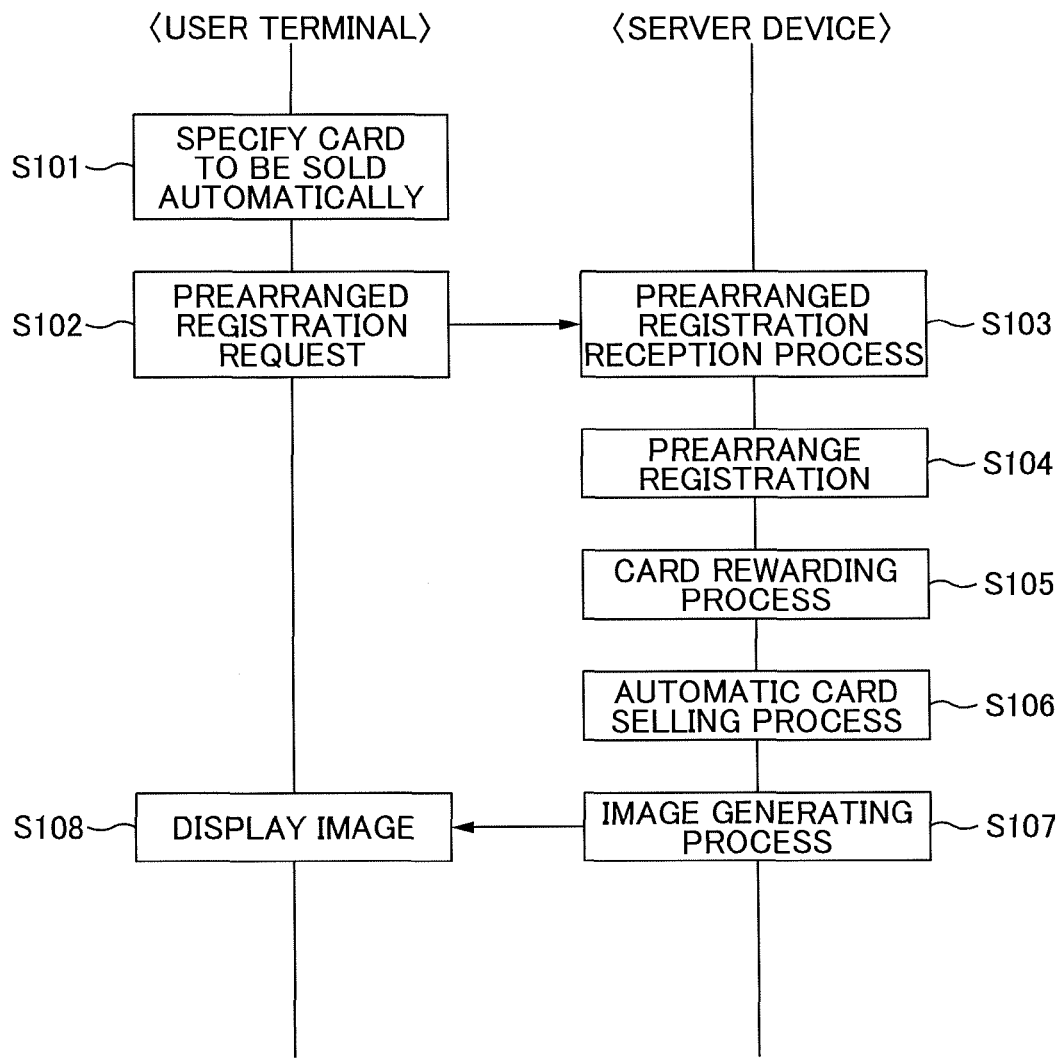
FIG. 10 is a flowchart describing an operation example of the game system 1 according to the present embodiment.
Figure 11:
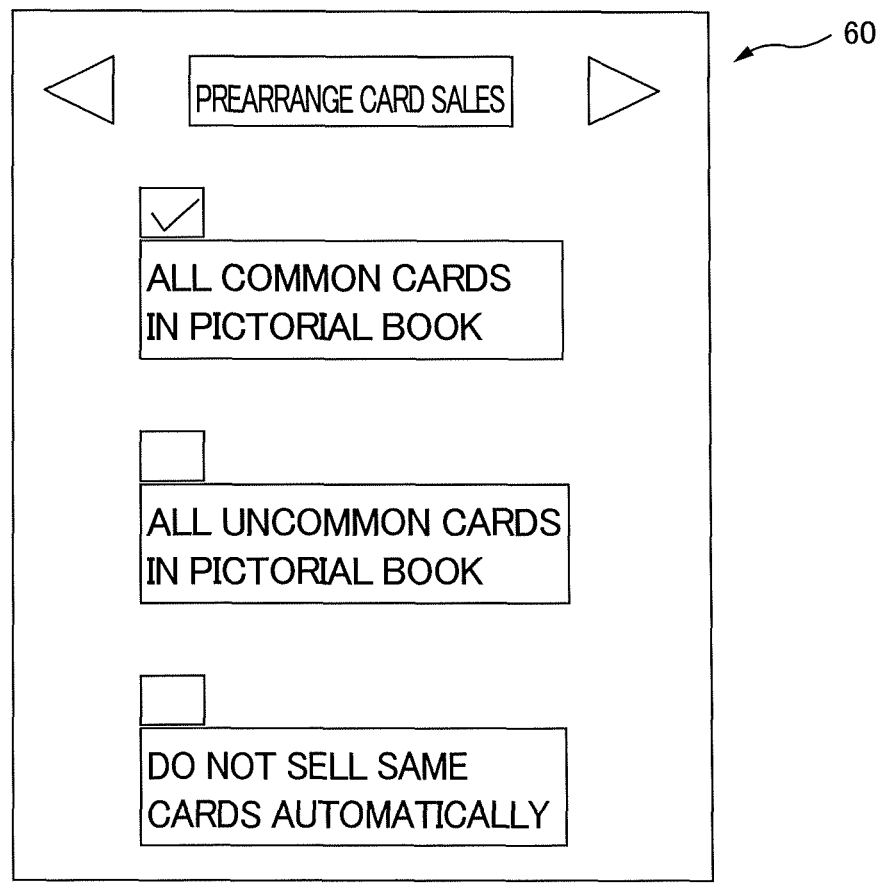
FIG. 11 illustrates an example of a play image when prearranging sales of a game card.
Figure 12:
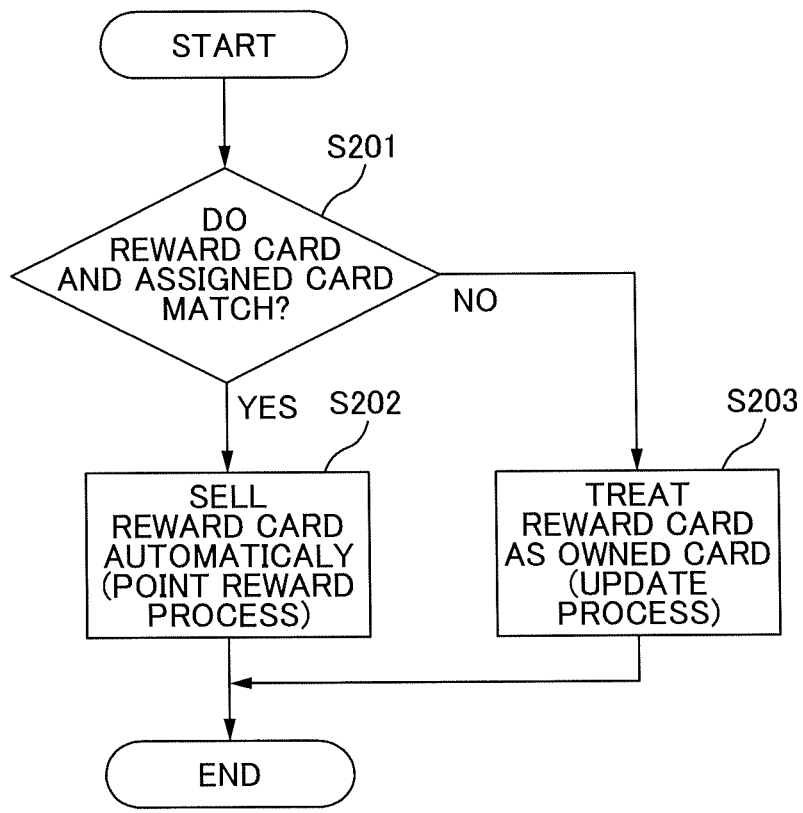
FIG. 12 is a flowchart describing an operation example of automatic card selling according to the present embodiment.
Figure 13:
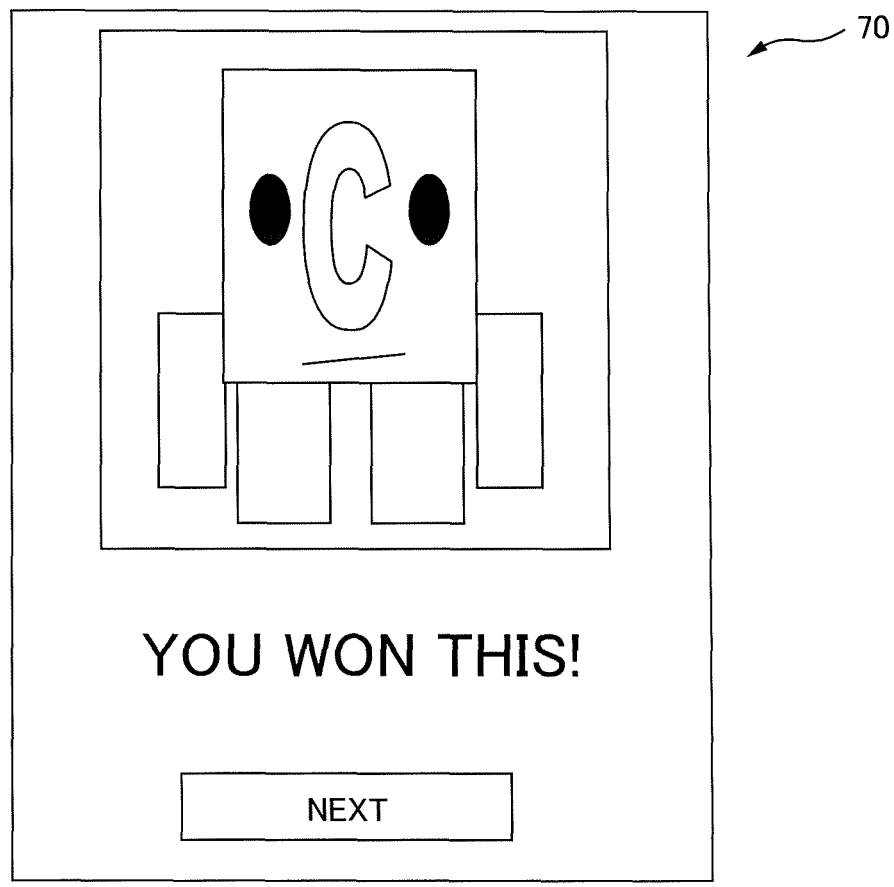
FIG. 13 illustrates an example of a play image when a game card is offered.
Figure 14:
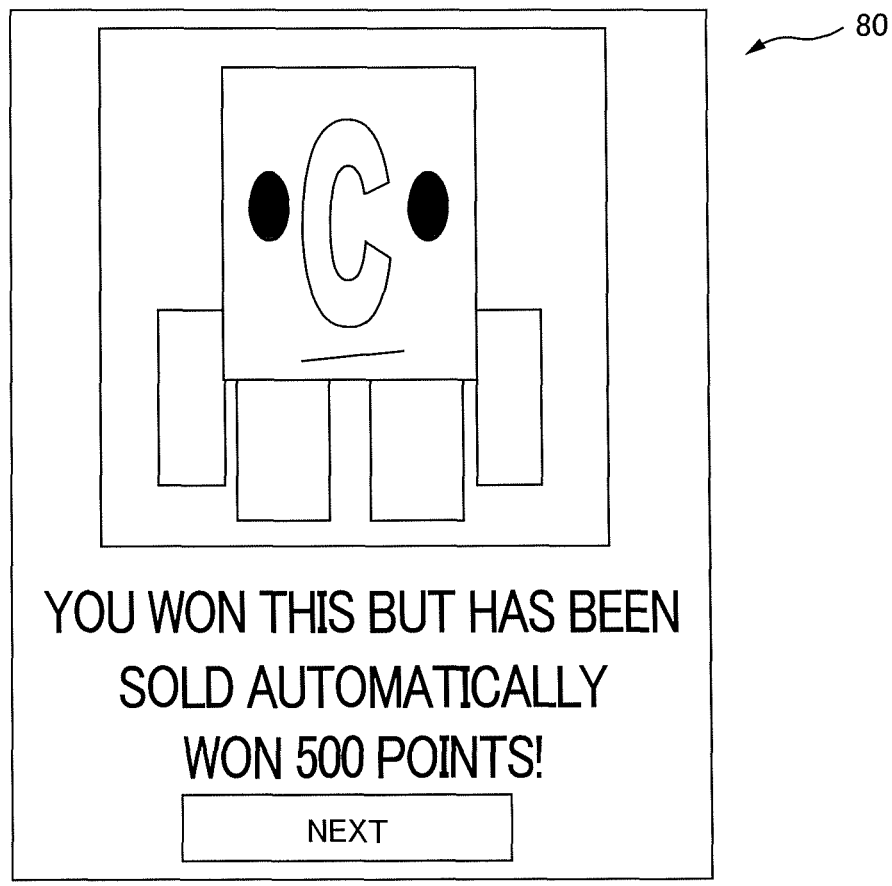
FIG. 14 illustrates an example of a play image when a game card is sold automatically.

Detailed description of the automatic card selling process will be given with reference to FIGS. 10 to 14. FIG. 10 is a flowchart describing an operation example of the game system 1 according to the present embodiment. FIG. 11 illustrates an example of a play image when prearranging sales of a game card. FIG. 12 is a flowchart describing an operation example of automatic card selling according to the present embodiment. FIG. 13 illustrates an example of a play image when a game card is offered. FIG. 14 illustrates an example of a play image when a game card is sold automatically.

First, the user displays a play image for setting automatic card sales on the terminal display unit 24 by operating the terminal input unit 23 of the user terminal 20. A play image 60 (operation screen) as shown in FIG. 11 is displayed on terminal display unit 24 in the present embodiment. Then the user specifies in advance the game cards (hereinafter, specified cards) that are subject to automatic selling, in other words unnecessary for the user by operating the terminal input unit 23 (S101).

When unnecessary cards are specified by the user in this game system 1, the user may specify the unnecessary game cards one by one by using the card ID (e.g., 0001) of the game card, or by the user specifying the unnecessary game card using attribute information common to a plurality of game cards, such as, the category of the character (e.g., "Warrior A" having card IDs 0001 to 0004), rarity (e.g., "common" having "1" set to the first digit of the card ID), job category (e.g., warrior characters such as "Warrior A" and "Warrior B" having "0" set to the third digit of the card ID), values of the initial attack power and initial defense power that are equal to or less than the threshold value (e.g., equal to or less than 50), point offered by selling that is equal to or less than the threshold value (e.g., equal to or less than 500 points), and the like.

Further in this game system 1, the user is made to specify unnecessary game cards among the game cards that has ever been owned by the user. In other words, the user can specify any game card among the plurality of game cards included in the pictorial book information (see FIG. 9). For such reason, game cards that has ever been owned by the user are prearranged for registration as specified cards so that game cards that have never been owned will not be sold automatically.

The user selects a check box among "ALL COMMON CARDS IN PICTORIAL BOOK", "ALL UNCOMMON CARDS IN PICTORIAL BOOK" AND "DO NOT SELL SAME CARDS AUTOMATICALLY" that are shown in play image 60 (see FIG. 11) displayed on the terminal display unit 24 by operating the terminal operation unit 23 in the present embodiment. The present embodiment assumes that "ALL COMMON CARDS IN PICTORIAL BOOK" is selected by the user. The game cards having a certain rarity are selected as the specified card by the user in this way. Since the necessity of the game card having rarity specified by the user is judged automatically, the user need not perform an operation for selecting unnecessary game cards and selling them. Thus time and effort to perform a manipulated input can be relieved.

Next, the user terminal 20 makes a request for prearranging a registration of the specified card selected by the user (S102). In other words, upon reception of an input signal, from the terminal input unit 23, indicating a request to prearrange a registration based on a user's operation, the terminal control unit 21 transmits to the server device 10 information relating to the specified card specified by the user as well as sets a user ID to the command (prearranged registration request) requesting to prearrange a registration to be transmitted to the server device 10.

Then the server device 10 receives the prearranged registration of the specified card specified by the user (S103). In other words, the reception unit 115 of the server device 10, upon reception of a request to prearrange registration transmitted from the user terminal 20, prearranges registration of information relating to the specified card specified by the user (S104). Since "ALL COMMON CARDS IN PICTORIAL BOOK" was selected by the user in the present embodiment, this means that all game cards having "COMMON" rarity among the game cards that has ever been owned by the user are prearranged for registration. In other words, this means that game cards having card IDs included in the pictorial book information (card IDs having "TRUE" set thereto) and game cards having "COMMON" set in the rarity field included in the card information are registered in the memory in advance as judging conditions for the control unit 11 to judge whether the cards are unnecessary cards or not. In this way, only game cards that have ever been owned by the user are prearranged for registration as specified cards so that game cards that have never been owned by the user are not sold automatically. Additionally, game cards beside those that have the rarity specified by the user are not sold automatically. Therefore the necessity or unnecessity of the game cards that are not sold automatically can be certainly judged by the user himself/herself.

Here, game cards are offered to the user when then the card offering process is started (S105). In the present embodiment, the offer unit 111 in the server device 10 executes the game process of the battle card game or the random selection game to determine the game card to be offered to the user.

Next, when the game card (offer card) to be offered to the user is determined as a result of the aforementioned card offering process, the server device 10 already having prearranged registration set by the user (S104), executes the automatic card selling process (S106).

Specifically, by the judging unit 112 in the server device 10 firstly comparing the offered card offered to the user in the card offering process and the specified card prearranged for registration, judges whether or not the offered card is to be an owned card owned by the user, as shown in FIG. 12. In the present embodiment, the judging unit 112 judges whether or not the offer card matches the specified card (S201). And since the game cards that become unnecessary are prearranged and registered as a specified card, the judging unit 112 determines the offer card to be an unnecessary game card when making a match, and determines as a game card to be owned by the user when not making a match. Specifically, since "ALL COMMON CARDS IN PICTORIAL BOOK" is prearranged for registration as a specified card, the judging unit 112 judges whether or not the card ID of the offer card matches the card ID included in the pictorial book information (see FIG. 9) (pictorial book information having "TRUE" set), and whether or not the rarity of the offer card is "COMMON", as well. And the judging unit 112 determines the offer card to be an unnecessary game card when all the conditions are satisfied and determines the offer card to be owned by the user when any of the conditions is denied.

Next, the control unit 11 in the server device 10 automatically sells the offer card when the judging unit 112 determines the offer to be an unnecessary game card (S202). In the present embodiment, the control unit 11 performs a process for making the offer card from becoming a user's owned card, and performs a process for converting the offer card that has become unnecessary into play points to be offered to the user. Since unnecessary game cards are automatically converted into play points in this way, time and effort to perform a manipulated input can be relieved compared to the case of a manual card selling process.

Additionally, when the judging unit 112 determines that the offer card is a game card to be owned (owned card) by the user, the control unit 11 in the server device 10 performs a process for making the offer card the user's owned card. In the present embodiment, the updating unit 114 of the server device 10 performs the update process for updating the user's owned card information (S203). Specifically, the updating unit 114 resets the game cards owned by the user by adding the card ID of the offer card as a card ID of an owned card to the owned card information (see FIG. 8).

Next, the server device 10 performs an image generating process for generating a play image (S107), as shown in FIG. 10. In other words, when the judging unit 112 determines the offer card to be an unnecessary game card (S202), the control unit 11 in the server device 10 generates a play image 80 indicating that automatic selling has been performed, as shown in FIG. 14, to be transmitted over the network 2 to the user terminal 20. Further, when the judging unit 112 determines that the offer card is a game card to be owned by the user (owned card) (S203), the control unit 11 generates a play image 70 indicating that the offer card has become a user's owned card, such as that shown in FIG. 13, to be transmitted on the network 2 to the user terminal 20.

Next, the user terminal 20 displays on the terminal display unit 24 the play images 70, 80 received from the server device 10 over the network 2. In this way, the user, by looking at the play images 70, 80 displayed on the terminal display unit 24, can specifically recognize that the offer card has been automatically sold or the offer card has become an owned card without being sold, as a result of the automatic card selling process performed in the game system 1.

As described above, time and effort for performing a manipulated input can be relieved according to the game system 1 of to the present embodiment since the necessity and unnecessity of an offer card is automatically judged by registering the specified card specified by the user in advance.

Other Embodiments

The present embodiment is for facilitating understanding of the present invention and is not intended to limit the interpretation of the present invention. Variations and modifications may be made in accordance with the spirit and scope of the present invention and equivalents thereof are included in the present invention. In particular, embodiments described below are to be included in the present invention.

Automatic Card Selling Process

In the aforementioned embodiment, the judging unit 112 can compare at once each of the plurality of offer cards offered at one time with a specified card in step 201 shown in FIG. 12 when a special random selection game is executed as the card offer process (S105). In the case of a manual card selling process, the user is made to perform complicated operations such as judging the necessity/unnecessity of the card, selling the cards for each of the plurality of offer cards offered at one time, however, in the case of an automatic card selling process, the necessity/unnecessity of each of the plurality of offer cards are automatically judged thus allowing time and effort required for a manipulated input to be further relieved.

Further, in the aforementioned embodiment, when the judging unit 112 has determined that the offer card is a game card to be owned by the user (owned card) (S201), a process for making the offer card a user's owned card has been performed (S203), however, the process is not limited to such and the following process may be performed.

For example, when the number of owned cards is limited, a process for keeping the offer card from becoming the user's owned card can be performed even when the offer card is determined as an owned card by the judging unit 112 in step 203 shown in FIG. 12. In this case, when determining that the offer card is to be a game card to be owned by the user (owned card) (S201), the judging unit 112 refers to the user's owned card information (see FIG. 8) to judge whether the number of the owned cards of the user has reached a predetermined value, and performs, a process for keeping the offer card from becoming the user's owned card when the number of owned cards has reached a predetermined value. When the number of owned cards has not reached a predetermined value, the judging unit 112 adds the card ID of the offer card to the user's owned card information (see FIG. 8). The game cards owned by the user are reset by the user's owned card information being updated in this way. In this way, the number of the user's owned card is limited thus allowing to relieve the time and effort required to perform a manipulated input for reducing the number of owned cards.

Further in the aforementioned embodiment, when determining that the offer card is an unnecessary game card (S201), the judging unit 112 automatically sold the unnecessary offer cards (S202), however, the process is not limited to such and the following process may be performed.

For example, the offer card determined to be an unnecessary game card may be made an owned card to be owned by the user. In this case, a friend user registered in the friend list of the user may be set as the other user. In this case, the control unit 11 refers to the user information (see FIG. 7) using the user ID as the key to specify the friend user. And the control unit 11 adds the card ID of the offer card determined as an unnecessary game card to the friend user's owned card information (see FIG. 8). In this way, the game card owned by the friend user is reset by the friend user's owned card information being updated. Thereby, users can communicate with each other thus allowing enjoyment between users to be increased.

For example, when the offer card determined to be an unnecessary game card forms a predetermined combination with an owned card that is already owned by the user, the offer card may be made the user's owned card even when the judging unit 112 determines the offer card to be an unnecessary game card in step 202 shown in FIG. 12. In this case, the control unit 11 can be made to perform a card composing process automatically without the user's manipulated input. In other words, the user's play points are automatically consumed and a game card is composed by an offer card and an owned card being combined. Thereby, a game card forming a certain combination is automatically composed so that time and effort required for performing a manipulated input for composing game cards can be relieved.

Further, for example, in a case a special random selection game is executed as the card offering process (S105), and an offer card determined as an unnecessary game card exists in the plurality of offer cards offered at one time and the particular offer card determined to be unnecessary forms a certain combination with another offer card in the plurality of offer cards offered at one time as well, the particular offer card can be determined as the user's owned card even when the judging unit 112 determines the particular offer card as an unnecessary game card in step 202 shown in FIG. 12. More specifically, in the case offer cards of the same category are included in the plurality of offer cards offered at one time by the special random selection game, the judging unit 112 may determine the offer cards of the same category as the user's owned cards even when they were determined as unnecessary game cards as a comparison result between the plurality of offer cards and the specified card. The reason for this is that when offer cards of the same category are deter mined as unnecessary game cards, chances for increasing the hit parameter by composing game cards will be lost bringing disadvantages to the user. Then the control unit 11 adds the card ID of the offer card determined as an unnecessary game card to the user's owned card information (see FIG. 8). In this way, the user's owned card information is updated and the game cards owned by the user are reset.

Note that in this case, the control unit 11 may execute an automatic card composing process without the user's input operation on the particular offer card and another offer card that forms a certain combination among the plurality of offer cards that had been offered at one time. In other words, the user's play points are automatically consumed and a game card is composed by the particular offer card and another offer card being combined. Thereby, a game card forming a certain combination is automatically composed so that time and effort required for performing a manipulated input for composing game cards can be relieved.

Assigning Automatic Card Selling

In the aforementioned present embodiment, at the time the user specifies the game cards that are subject to automatic selling, description was given taking an example of a case where the user was made to specify unnecessary game cards among the game cards that have ever been owned by the user. However, it is not limited to such case and the user may be made to specify unnecessary game cards among the game cards that have never been owned by the user. In this case, for example, such as "ALL COMMON CARDS" is displayed in the play image shown in FIG. 11. Thereby, only rarity will be specified by the user instead of specifying whether the card has ever been owned or not.

Further in the aforementioned present embodiment, at the time the user specifies the game cards that are subject to automatic selling, description was given taking an example of a case where prearranged registration was performed with the game cards unnecessary for the user as specified cards. However, it is not limited to such case and prearranged registration may be performed with the game cards necessary for the user as specified cards. In this case, the judging unit 112 of the server device 10 compares the offer card and the specified card to determine whether or not the offer card is to be made the user's owned card. In other words, the judging unit 112 has the necessary cards prearranged for registration as specified cards, so that the offer card is determined to be owned by the user when the two cards are determined to match, and the offer card is determined to be an unnecessary game card when the two cards are determined not to match. As a result, the offer card is automatically sold when the offer card is determined to be an unnecessary game card.

Card Rewarding Process

A battle card game and a random selection game were described as examples of the card offering process in the aforementioned present embodiment, however, the card offering process is not limited to such. For example, game cards may be offered by the user finishing a mission assigned to the user. Further, game cards may be offered by the user inputting a serial code displayed on a Web page and the like. Additionally, game cards may be offered by the user logging into the game system 1. Furthermore, game cards may be offered through an event (point consumption in an event, those in a high rank) provided in the game system 1.

Card Composition Process

Description was given taking an example of a case where a game card was composed by combining two game cards of the same category in the aforementioned present embodiment, however, composition of game cards is not limited to such and game cards can be composed by combining three or more game cards of the same category. The same applies to the case where game cards of different categories are combined to compose a game card. Further, game cards can be composed by combining a plurality of game cards of the same category and a plurality of game cards of different categories. For example, a game card may be composed by combining three game cards of the same category and two game cards of different categories (by combining a total of five game cards).

Additionally, when a special random selection game is executed as a card offering process, the control unit 11 can be made to execute the automatic card combining process without a user's manipulated input when a plurality of game cards that form a certain combination exist in the plurality of offer cards offered to the user. In such case, the user's play points are automatically consumed to compose a game card by combining an offer card and an owned card. Thereby, game cards that form a predetermined combination is automatically composed so that time and of fort for performing a manipulated input for composing a game card can be relieved.

Card Selling Process

In the aforementioned present embodiment, a point offering process that converts unnecessary game cards into play points to offer to the user was executed together with a process for keeping the unnecessary card from becoming the user's owned card when game cards are sold in the card selling process. However, the process is not limited to such and the point offering process may be omitted.

Image Generation Process

In the automatic card selling process in the aforementioned present embodiment, description was given taking an example of a case where an image generating process for generating a play image was performed, however, the process is not limited to such and the image generating process may be omitted.

Server Device

The present embodiment has described the game system 1 including one server device 10 as an example. However, the present invention is not limited in this way. In other words, a game system 1 including a plurality of server devices 10 can be given as an example of the server device. A plurality of server devices 10 may be connected via a network 2, and each server device 10 may execute various types of distributed processing.

Information Processing Device

In the present embodiment, the game system 1 has been described taking an example of a case where processes of the card offering process, card recording process, card selling process, card composing process, card history recording process and the like were executed by the server device 10 and the user terminal 20 working in cooperation based on a game program. However, the way in which the processes are executed is not limited to such and the user terminal 20 alone or the server device 10 alone, as the information processing device can be made to execute the aforementioned processes based on the game program.

Virtual Currency

In the aforementioned present embodiment, a certain amount of virtual currency was offered to the users periodically however, the way in which virtual currencies are offered is not limited to such and can be set accordingly. For example, the user can be made to buy virtual currencies. Further, virtual currencies may be offered to the user according to the communication made between the user and another user.

What is claimed is:

1. A non-transitory computer-readable storage medium of a server device in an electronic game system storing a game program for causing the server device including a processor and a memory to execute a game in which a user uses a game content and being connected to a network to communicate with one or more user terminals, the game program instructing the server device to perform processes comprising:
   a registration process to register in a storage unit in advance a specified game content specified by the user;
   an offering process to offer an offer game content to the user;
   a judgment process to compare the offer game content with the specified game content specified by the user and judge whether or not the offer game content is to be made an owned game content owned by the user; and
   a game content combining process to combine, when the offer game content is not made the owned game content, the offer game content with an owned game content already owned by the user to create an owned game content after the combination.

2. A non-transitory computer-readable storage medium according to claim 1, wherein the game program instructs the server device to perform:
   in the registration process, a registration of a game content having rarity specified by an input by the user into the storage unit, as the specified game content;
   in the offering process, an offering of an offer game content having rarity, to the user; and
   in the judgment process, judgments of whether or not the rarity of the offer game content and the rarity of the specified game content match and of whether or not the offer game content and an owned game content that have ever been owned by the user match, and a determination not to make the offer game content the owned game content owned by the user when any of the conditions are denied.

3. A non-transitory computer-readable storage medium according to claim 1, wherein the game program instructs the server device to perform:
   in the offering process, the offering of a plurality of the offer game contents at one time to the user; and
   in the game content combination process, the combination using the plurality of the offer game contents offered with the owned game content already owned by the user.

4. A server device in an electronic game system, the server device allowing a user to play a game using a game content and being connected to a network to communicate with one or more user terminals, the server device comprising:
   a storage unit that registers in advance a specified game content specified by the user;
   an offering unit that offers an offer game content to the user;
   a judging unit that compares the offer game content offered by the offering unit with a specified game content specified by the user, and judges whether or not the offer game content is to be made an owned game content owned by the user; and
   a control unit that controls, when the offer game content is not made the owned game content, to combine the offer game content with the owned game content already owned by the user and to create an owned game content after the combination.

* * * * *